April 4, 1950
G. H. COOK
HIGHLY CORRECTED THREE COMPONENT OPTICAL
OBJECTIVES OF LARGE APERTURE
Filed Nov. 29, 1948
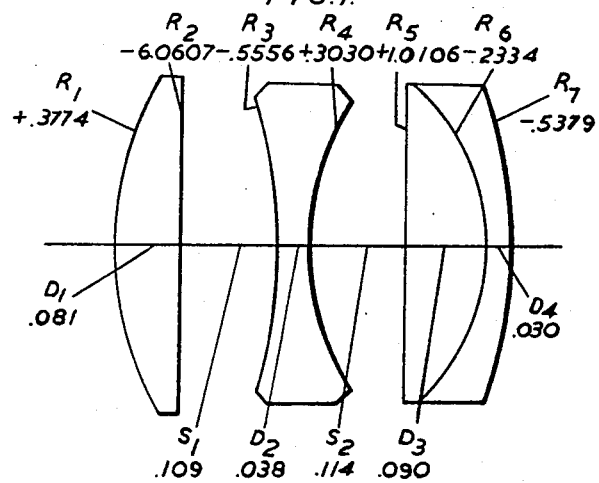
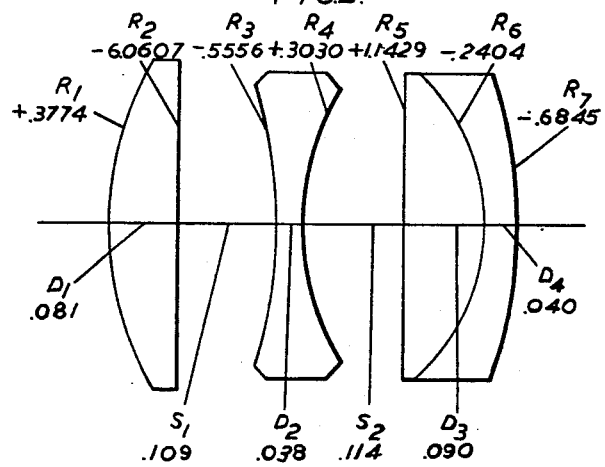
Inventor
Gordon H. Cook
By
Emery Holcombe & Blair
Attorneys Patented Apr. 4, 1950

2,502,508

SEARCH ROOM

UNITED STATES PATENT OFFICE 2,502,508

HIGHLY CORRECTED THREE COMPONENT OPTICAL OBJECTIVES OF LARGE APERTURE

Gordon Henry Cook, Leicester, England, assignor to Taylor, Taylor & Hobson Limited, Leicester, England, a company of Great Britain Application November 29, 1948, Serial No. 62,507
In Great Britain October 18, 1948

11 Claims. (Cl. 88—57)

This invention relates to an optical objective, primarily intended for photographic purposes, and of the kind corrected for spherical and chromatic aberrations, coma, astigmatism, distortion and field curvature and comprising a simple divergent component behind a simple convergent component and in front of a convergent doublet having a collective cemented surface concave to the front.

It should be mentioned that the terms "front" and "rear" are used herein in accordance with the usual convention to denote the sides of the objective respectively nearer to and further from the long conjugate.

The present invention has for its object to provide a higher degree of correction for zonal spherical aberration and for coma, and generally to give improved correction for the various aberrations over a reduced angular field, thereby permitting the objective to have a greater relative aperture and longer focal length than hitherto in objectives of this kind.

Further objects and advantages of the invention appear in connection with the following description, and illustrative embodiments of the invention are shown in the aompanying drawings, wherein Figs. 1 and 2 are diagrammatic views of two objectives of similar type having like characteristics except for the rear component.

In the objective according to the invention, the overall axial length of the objective from the front surface of the front component to the rear surface of the rear component lies between one-third and two-thirds of the equivalent focal length of the objective, the front and rear axial air separations between the components lying respectively between .08 and .14 and between .09 and .15 times such focal length, whilst the mean refractive index of the front element of the rear component exceeds that of the rear element thereof by at least .07, and the radius of curvature of the cemented surface lies between .50 and 1.00 times the effective diameter of the front surface of the objective (that is, the reciprocal of the relative aperture or F number of the objective, if the equivalent focal length is taken as unity).

To improve the coma correction of the objective, the rear surface of the convergent front component is preferably concave to the front and has radius of curvature greater than twice the equivalent focal length of the objective, whilst the radius of curvature of the rear surface of the divergent middle component lies between .25 and .40 times such focal length, such surface being convex to the front.

The concave front surface of the divergent middle component preferably has radius of curvature between .40 and .75 times the equivalent focal length of the objective. This improves the astigmatism correction and further improvement in this correction can be obtained by making the radius of curvature of the convex front surface of the compound rear component greater than that of the rear surface thereof, such rear surface being concave to the front.

The lateral colour and distortion corrections can be improved by making the power of the compound rear component somewhat greater than that of the convergent front component.

The radius of curvature of the convex front surface of the front component conveniently lies between .30 and .50 times the equivalent focal length of the objective.

Numerical data for two convenient practical examples of objective according to the invention as illustrated in Figs. 1 and 2, respectively, are given in the following tables, in which $R_1 R_2 \ldots$ represent the radii of curvature of the individual surfaces of the objective, the positive sign indicating that the surface is convex to the front and the negative sign that the surface is concave to the front, $D_1 D_2 \ldots$ represent the axial thicknesses of the various lens elements, and $S_1 S_2$ represent the axial air separations between the components. The tables also give the mean refractive indicies for the D-line and the Abbé V numbers for the materials of which the lens elements are made.

Example I

| Radius | Thickness or Air Separation | Refractive Index $n_D$ | Abbé V Number |
|---|---|---|---|
| $R_1+ .3774$ | | | |
| | $D_1$ .081 | 1.62250 | 60.4 |
| $R_2 -6.0607$ | | | |
| | $S_1$ .109 | | |
| $R_3- .5556$ | | | |
| | $D_2$ .038 | 1.62266 | 36.0 |
| $R_4+ .3030$ | | | |
| | $S_2$ .114 | | |
| $R_5+1.0106$ | | | |
| | $D_3$ .090 | 1.61380 | 57.5 |
| $R_6- .2334$ | | | |
| | $D_4$ .030 | 1.51414 | 56.5 |
| $R_7- .5379$ | | | |

Equivalent Focal Length 1.000. Relative Aperture F/2.67

Example II

| Radius | Thickness or Air Separation | Refractive Index $n_D$ | Abbé V Number |
|---|---|---|---|
| $R_1+ .3774$ | | | |
| | $D_1$ .081 | 1.62250 | 60.4 |
| $R_2-6.0607$ | | | |
| | $S_1$ .109 | | |
| $R_3- .5556$ | | | |
| | $D_2$ .038 | 1.62266 | 36.0 |
| $R_4+ .3030$ | | | |
| | $S_2$ .114 | | |
| $R_5+1.1429$ | | | |
| | $D_3$ .090 | 1.69150 | 55.0 |
| $R_6- .2404$ | | | |
| | $D_4$ .040 | 1.55165 | 51.6 |
| $R_7- .6845$ | | | |

Equivalent Focal Length 1.000. Relative Aperture F/2.67

It will be noticed that these two examples differ from one another solely in the arrangement of the rear doublet, the materials used for the two elements thereof in the second example having higher refractive index and greater difference of index than in the first example, the index difference being approximately .10 in Example I and .14 in Example II. Since the relative aperture in each case is F/2.67, the effective diameter of the front surface is .375 times the equivalent focal length, and the radius $R_6$ in both examples is less than this figure and greater than half this figure.

The overall length of the objective is in Example I .462 and in Example II .472 times the equivalent focal length.

The powers of the three components in both examples are approximately +1.75, −3.23, and +1.92 respectively, the power of the rear component in each case being appreciably larger than that of the first component.

What I claim as my invention and desire to secure by Letters Patent is:

1. An optical objective, corrected for spherical and chromatic aberrations, coma, astigmatism, distortion and field curvature, and comprising a simple convergent front component, a simple divergent component spaced therefrom by an axial distance lying between .08 and .14 times the equivalent focal length of the objective, and a convergent rear doublet component spaced from the divergent component by an axial distance lying between .09 and .15 times such equivalent focal length and having a collective cemented surface concave to the front with radius of curvature lying between .50 and 1.00 times the effective diameter of the front surface of the objective, the mean refractive index of the front element of the rear component exceeding that of the rear element thereof by at least .07, whilst the overall length of the objective from the front surface of the front component to the rear surface of the rear component lies between one-third and two-thirds of the equivalent focal length of the objective.

2. An optical objective as claimed in claim 1, in which the front surface of the convergent rear doublet is convex to the front and has radius of curvature between one and five times that of the rear surface thereof, such rear surface being concave to the front.

3. An optical objective as claimed in claim 1, in which the power of the convergent rear doublet lies between 1.0 and 1.5 times that of the convergent front component.

4. An optical objective as claimed in claim 1, in which the front surface of the divergent middle component is concave to the front and has radius of curvature between .40 and .75 times the equivalent focal length of the objective.

5. An optical objective as claimed in claim 1, in which the front surface of the front component is convex to the front and has radius of curvature between .30 and .50 times the equivalent focal length of the objective.

6. An optical objective, corrected for spherical and chromatic aberrations, coma, astigmatism, distortion and field curvature, and comprising a simple convergent front component, whose rear surface has radius of curvature greater than twice the equivalent focal length of the objective, a simple divergent component spaced therefrom by an axial distance lying between .08 and .14 times such focal length and having its rear surface convex to the front with radius of curvature between .25 and .40 times such focal length, and a convergent rear doublet component spaced from the divergent component by an axial distance lying between .09 and .15 times such equivalent focal length and having a collective cemented surface concave to the front with radius of curvature lying between .50 and 1.00 times the effective diameter of the front surface of the objective, the mean refractive index of the front element of the rear component exceeding that of the rear element thereof by at least .07, whilst the overall length of the objective from the front surface of the front component to the rear surface of the rear component lies between one-third and two-thirds of the equivalent focal length of the objective.

7. An optical objective as claimed in claim 6, in which the front surface of the divergent middle component is concave to the front with radius of curvature between .40 and .75 times the equivalent focal length of the objective, and the front surface of the convergent rear doublet is convex to the front with radius of curvature between one and five times that of the rear surface of the doublet, such rear surface being concave to the front.

8. An optical objective as claimed in claim 7, in which the power of the convergent rear doublet lies between 1.0 and 1.5 times that of the convergent front component.

9. An optical objective as claimed in claim 6, in which the front surface of the front component is convex to the front and has radius of curvature between .30 and .50 times the equivalent focal length of the objective, the front surface of the divergent middle component is concave to the front with radius of curvature between .40 and .75 times the equivalent length of the objective, and the front surface of the convergent rear doublet is convex to the front with radius of curvature between one and five times that of the rear surface of the doublet, such rear surface being concave to the front.

10. An optical objective as claimed in claim 6, in which the power of the convergent rear doublet lies between 1.0 and 1.5 times that of the convergent front component.

11. An optical objective as claimed in claim 6, in which the front surface of the front component is convex to the front and has radius of curvature between .30 and .50 times the equivalent focal length of the objective.

GORDON HENRY COOK.

REFERENCES CITED

The following references are of record in the file of this patent:

UNITED STATES PATENTS

| Number | Name | Date |
|---|---|---|
| 1,849,681 | Merte et al. | Mar. 15, 1932 |
| 2,158,178 | Frederick et al. | May 16, 1939 |
| 2,165,328 | Aklin et al. | July 11, 1939 |

FOREIGN PATENTS

| Number | Country | Date |
|---|---|---|
| 209,371 | Great Britain | Jan. 10, 1924 |
| 240,508 | Great Britain | Oct. 6, 1926 |